Sept. 28, 1926.
G. H. NYSTRÖM
AUTOMOBILE HEADLIGHT GLASS
Filed May 8, 1923        2 Sheets-Sheet 1
1,601,688
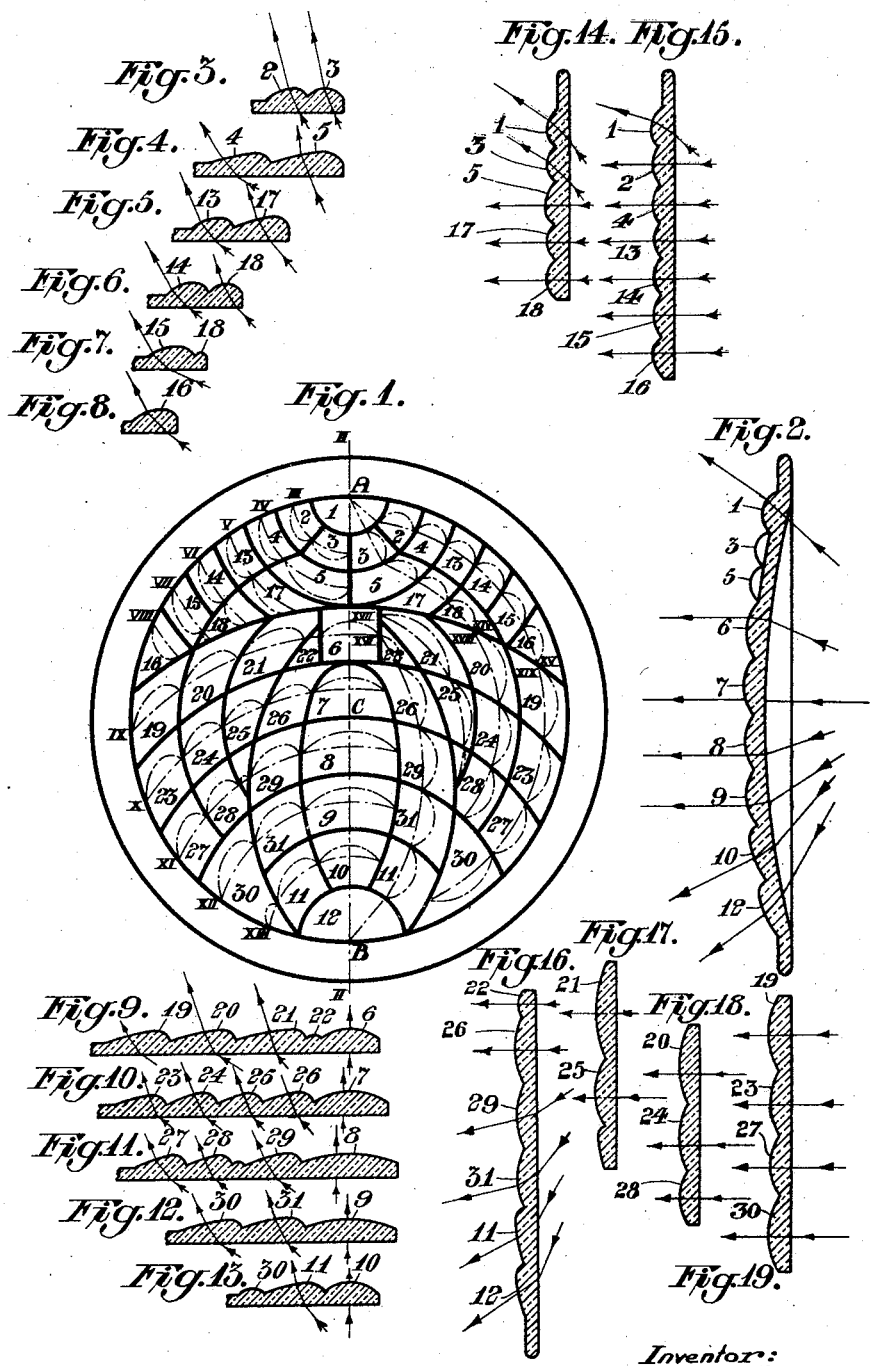

Sept. 28, 1926.
G. H. NYSTRÖM
AUTOMOBILE HEADLIGHT GLASS
Filed May 8, 1923
1,601,688
2 Sheets-Sheet 2
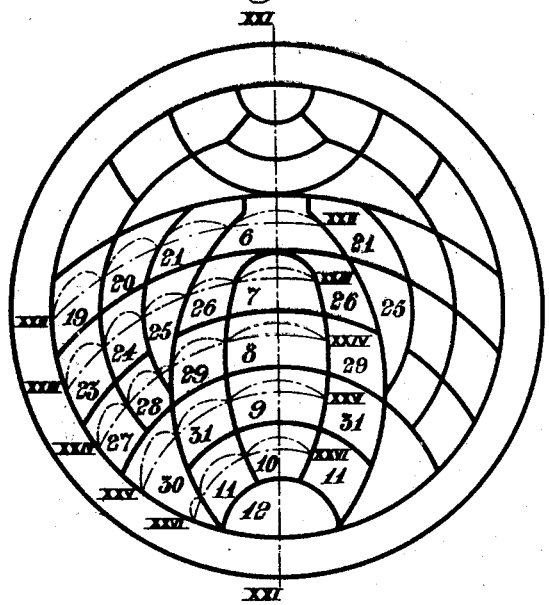
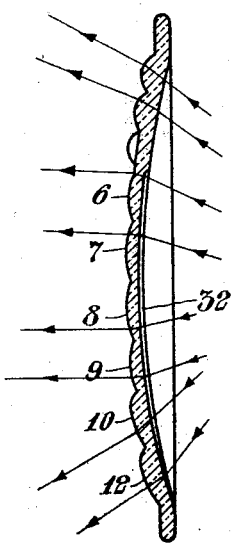
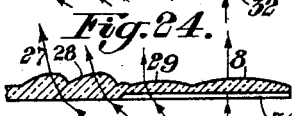
Inventor:
Gustaf Herman Nyström
By George Bayard Jones
Atty.

Patented Sept. 28, 1926.

1,601,688

UNITED STATES PATENT OFFICE.

GUSTAF HERMAN NYSTRÖM, OF COLUMBUS, OHIO, ASSIGNOR TO HARRIETT MELVINA NYSTROM.

AUTOMOBILE HEADLIGHT GLASS.

Application filed May 8, 1923. Serial No. 637,507.

The present invention relates to a glass which is particularly intended to be used for headlights for automobiles, motor cycles, bicycles and the like, the object of the invention being to produce a glass which shall throw the light in the desired direction forward as well as upwards and downwards to both sides and thus produce a good and satisfactory illumination of the roadway without throwing a blinding glare against an approaching driver.

For attaining this purpose the present glass the front face of which is provided in well known manner with a number of bosses resembling prisms or lenses, is principally characterized by that said bosses are so shaped within different portions or compartments of the glass that the bosses of an upper compartment of the glass throw the light rays mainly in an upward direction, whereas the bosses of a central compartment of the glass below said upper compartment throw the light rays in a direction substantially straight ahead, and the bosses of a lower compartment below said central compartment throw the light rays substantially in a direction downwards, the bosses of compartments on either side of said upper compartment throw the light rays sideways and upwards and the bosses of compartments on either side of said central and lower compartments throw the light rays sideways and downwards.

It is suitable to make the central compartment of the glass and preferably also its lower compartment thinner than the remaining portions. In this manner a stronger beam of light for illumination of the roadway straight ahead will be obtained. The bosses of the central compartment may for instance be made lower than the bosses of the other portions or compartments. A recess may also be made in the rear face of the glass opposite the central compartment and preferably also opposite the lower compartment so that the glass becomes thinner in said compartment or compartments.

The accompanying drawings illustrate by way of example two headlight glasses according to the present invention. Fig. 1 shows the front face of one of the glasses, of which Fig. 2 shows a vertical cross section. Figs. 3 to 19 incl. show cross sections on the lines III to XIX incl. in Fig. 1. Fig. 20 shows a front view of the other glass, of which Fig. 21 shows a vertical section. Figs. 22 to 26 incl. show sections on the lines XXII to XXVI incl. in Fig. 20.

As illustrated in Fig. 1 the front face of the glass is provided with a number of bosses resembling prisms or lenses. The glass is symmetrical on both sides of its vertical diameter A—B. The bosses are divided into a number of compartments the bosses of which throw the light rays substantially in one certain direction for each compartment. The upper compartment comprises the bosses 1, 2, 2, 3, 3, 4, 4, 5, 5 the boundaries between which are circular arcs having as their center the upper terminal point A of the vertical diameter A—B of the glass, and lines radial to said arcs, as well as arcs having the center C of the glass as their center. As illustrated in the various sections the upper surfaces of the bosses 1 to 5 incl. of said compartment are substantially slowly sloping in a direction upwards, that is to say towards the circumference of the glass, whilst in the direction towards the center of the glass said surfaces of the bosses slope more abruptly, that is to say the radii of curvature of the surfaces are smaller. Said bosses will therefore throw the light substantially in an upward direction for illuminating viaducts, gateways, and the like.

Below said upper compartment there is a central compartment comprising the bosses 6, 7, 8 and 9. Said bosses are bounded by circular arcs having as their center the lower terminal point B of the vertical diameter A—B, and by elliptic arcs the transverse axis of which coincides with the said diameter. As shown in the various sections the said bosses 6, 7, 8 and 9 are substantially convex and lens-shaped, their upper surfaces sloping practically equally in all directions. Said bosses will therefore throw a clear beam of light straight ahead for illuminating the roadway.

Below said central compartment there is a lower compartment comprising the bosses 10, 11, 11, and 12 which are bounded by circular arcs having the point B as their center and by elliptic arcs. As shown in the sections the upper surfaces of said bosses 10, 11, 11 and 12 slope slowly in a direction downwards towards the circumference of the glass, and slope comparatively more abruptly in the direction towards the center of the glass. The said bosses will therefore direct the light rays down towards the roadway immediately in front of the vehicle.

On either side of the upper compartment there is an approximately triangular compartment which comprises the bosses 13, 14, 15, 16, 17, 18 which are bounded and separated by circular arcs having the point A as their center, circular arcs having the center C of the glass as their center, and a circular arc having the point B as its center. As shown in the sections the upper surfaces of the bosses of these compartments slope slowly in the direction towards the circumference of the glass, and slope more abruptly on the inner sides. Said bosses will therefore throw the light obliquely upwards and effect illumination of objects at the sides of the roadway, such as sign-posts, telephone poles, and the like.

Below said upper side compartments and on either side of the central and lower compartments there are side compartments comprising the bosses 19, 20, 21, 22, 23, 24, 25, 26, 27, 28, 29, 30, 31 which are bounded and separated by circular arcs having their center in the point B, and by circular arcs having their center in the point C, and of the elliptic arcs previously mentioned. As shown in the sections the upper surfaces of said bosses slope slowly in a direction towards the circumference of the glass and slope more abruptly in a direction towards the center of the glass. The bosses in said lower side compartments will therefore throw the light obliquely downwards so that the roadsides will be clearly lighted, and the driver will also be able to see to turn into a cross-road.

The glass illustrated in Figs. 20 to 26 incl. has, viewed from the front, substantially the same appearance as the glass above described with the exception that in some instances two adjacent bosses on the glass described have been united into one boss on the glass according to this second embodiment. In addition, a few of the bosses which according to the first embodiment belong to the lower side compartments, have been transferred to the central compartment, namely the bosses 21, 25, 26, 29, 31 which according to this embodiment are substantially convex and lens-shaped, as are the central bosses 6, 7, 8, 9, as shown in the sections, their upper surfaces thus sloping practically equally in all directions. The different sections also show that all of these bosses are lower than the bosses of the remaining surrounding compartments, for instance the bosses 19, 20, 23, 24, 27, 28, 30, 10, 11 and 12.

The different sections also show a recess 32 in the rear face of the glass opposite the said central compartment and, in the embodiment illustrated, also opposite the lower compartment which consists of the bosses 10, 11, 11 and 12, so that also owing to said recess the glass becomes thinner in these compartments than in the other compartments. In this manner the luminous intensity of the light from said compartments is increased so that more light is obtained for illuminating the roadway straight ahead.

It will be understood that various changes and modifications may be made in the embodiments described without departing from the principle of the invention.

I claim:—

1. A headlight glass having one face divided into compartments comprising prism-shaped or lens-shaped bosses, the bosses of a central compartment being substantially convex and lens-shaped so as to throw the light substantially in a direction straight ahead, the bosses of an upper compartment above said central compartment having their outer surfaces slowly sloping in an upward direction towards the circumference of the glass and sloping more abruptly in a direction towards the center of the glass so as to throw the light substantially in an upward direction, the bosses of compartments on either side of said upper compartment having their outer surfaces slowly sloping in directions obliquely upwards towards the circumference of the glass and more abruptly in a direction towards the center of the glass so as to throw the light substantially obliquely upwards, the bosses of a lower compartment below said central compartment having their outer surfaces slowly sloping in a downward direction towards the circumference of the glass and more abruptly in a direction towards the center of the glass so as to throw the light substantially in a downward direction, and the bosses of compartments on either side of said central and lower compartment having their outer surfaces slowly sloping in directions obliquely downwards towards the circumference of the glass and more abruptly in a direction towards the center of the glass so as to throw the light substantially obliquely downwards.

2. A headlight glass according to claim 1, in which the bosses of the central compartment are of less height than the bosses of the other compartments.

3. A headlight glass according to claim 1, in which the glass is provided with a recess in its other face opposite the central compartment.

4. A headlight glass according to claim 1, in which the glass is provided with a recess in its other face opposite the central compartment, and in which the bosses of said central compartment are of less height than the bosses of the other compartments.

5. A headlight glass having an upper substantially semi-circular compartment of one of its faces comprising prism-shaped bosses the boundaries of which are circular arcs having as their center the upper terminal point of a vertical diameter of the glass and lines substantially radial to said arcs, the bosses of said upper compartment being adapted to throw the light substantially in an upward direction, two substantially triangular compartments located on the sides of said upper compartment and comprising prism-shaped bosses the boundaries of which are circular arcs having as their center the upper terminal point of a vertical diameter of the glass and circular arcs having their center in the center of the glass, the bosses of said triangular compartments being adapted to throw the light substantially in directions obliquely upward, a central compartment below said upper compartment and comprising substantially lens-shaped bosses the boundaries of which are circular arcs having their center in the lower terminal point of a vertical diameter of the glass and elliptic arcs the transverse axis of which coincides with said diameter, the bosses of said central compartment being adapted to throw the light substantially in a direction straight ahead, a lower compartment below said central compartment comprising substantially prism-shaped bosses the boundaries of which are circular arcs having their center in the lower terminal point of a vertical diameter of the glass and elliptic arcs the transverse axis of which coincides with said diameter, the bosses of said lower compartment being adapted to throw the light substantially in a downward direction, and substantially triangular compartments on the sides of said central and lower compartments and comprising substantially prism-shaped bosses the boundaries of which are circular arcs having their center in the lower terminal point of the vertical diameter of the glass and circular arcs having their center in the center of the glass, the bosses of said last-mentioned triangular compartments being adapted to throw the light substantially in directions obliquely downwards.

6. A headlight glass according to claim 5, in which the bosses of the central compartment are of less height than the bosses of the other compartments.

7. A headlight glass according to claim 5, in which the glass is provided with a recess in its other face opposite the central compartment.

8. A headlight glass according to claim 5, in which the glass is provided with a recess in its other face opposite the central compartment, and in which the bosses of said central compartment are of less height than the bosses of the other compartments.

GUSTAF HERMAN NYSTRÖM.